March 24, 1964

D. J. DICKERSON 3,126,157

RESIN AND GLASS FIBER APPLICATOR GUN

Filed July 23, 1962

INVENTOR.
DELBERT J. DICKERSON
BY White and Haefliger
ATTORNEYS.

March 24, 1964  D. J. DICKERSON  3,126,157
RESIN AND GLASS FIBER APPLICATOR GUN
Filed July 23, 1962  3 Sheets-Sheet 2
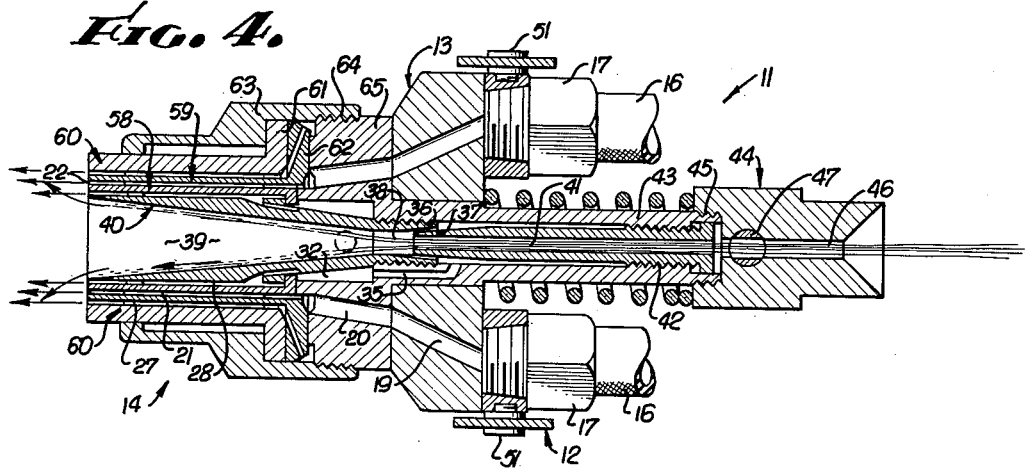
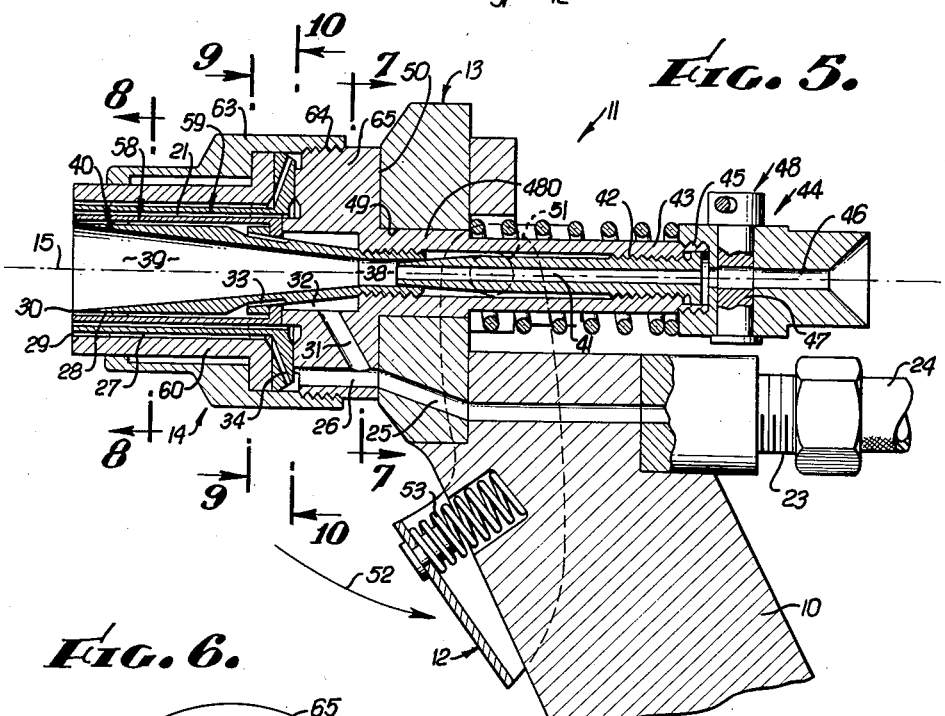
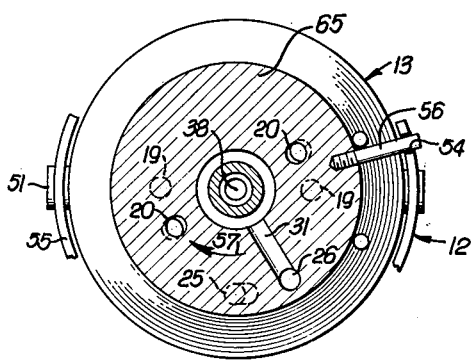
INVENTOR.
DELBERT J. DICKERSON
BY
White and Haefliger
ATTORNEYS.

March 24, 1964
D. J. DICKERSON
3,126,157
RESIN AND GLASS FIBER APPLICATOR GUN
Filed July 23, 1962
3 Sheets-Sheet 3
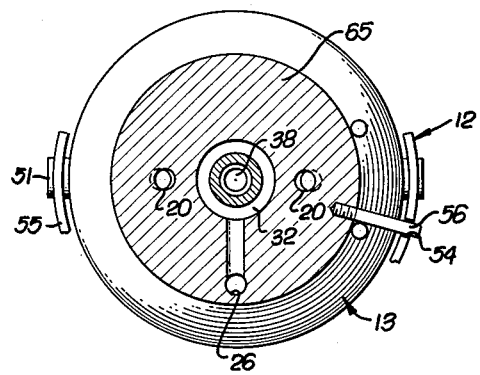
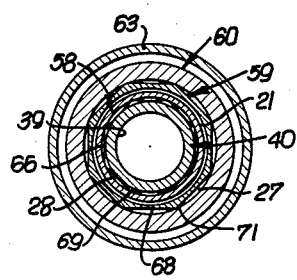
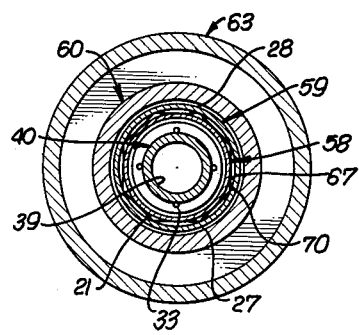
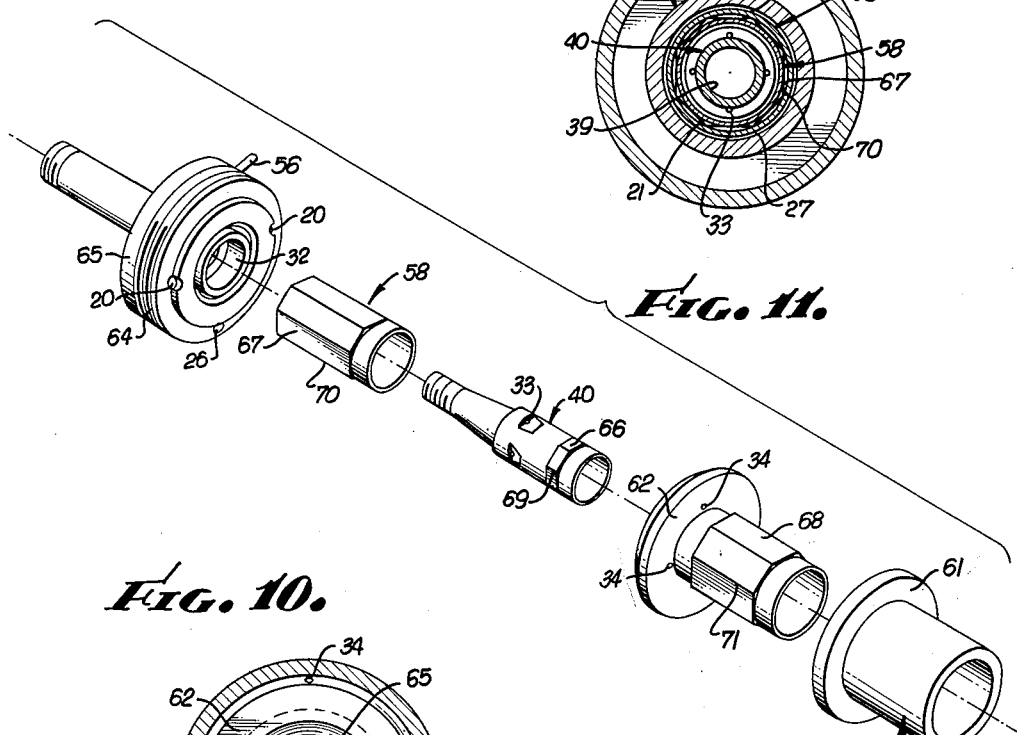
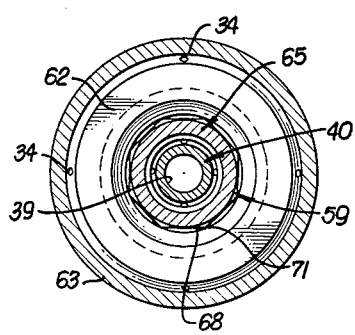
INVENTOR.
DELBERT J. DICKERSON
BY
White and Haefliger
ATTORNEYS.

United States Patent Office 3,126,157
Patented Mar. 24, 1964

3,126,157
RESIN AND GLASS FIBER APPLICATOR GUN
Delbert J. Dickerson, P.O. Box 6, Agoura, Calif., assignor of one-half to Jon Hall, Malibu, Calif.
Filed July 23, 1962, Ser. No. 211,486
11 Claims. (Cl. 239—415)

This invention relates generally to apparatus useful for applying glass fibers and resin against mold surfaces in order to form shells such as boat hulls, vehicle bodies and the like. More particularly, the invention has to do with apparatus and methods for fragmenting glass fiber multiple strand material and delivering same in a stream of compressed air for intimate mixing with resin while the glass fibers are being carried forwardly to the mold surface region.

It is a major object of the invention to provide a novel apparatus and method for creating and controlling the delivery of glass fibers along with binder resin, all carried in a pressurized air stream, in such manner as to increase the ease and control of laying up glass fibers and binder resin upon the mold bodies or surfaces. Broadly considered, the invention contemplates the provision of apparatus comprising a head structure having terminally opening passages, including a first located for delivering a glass fiber type multiple strand in a generally forward direction, a second passage being located for delivering pressurized gas to fragment the strand terminal and entrain the fiber fragments openly carrying them in a generally forward direction, and a third passage being located for delivering fluidized resin in a generally forward direction to mix with the gas entrained forward travelling glass fragments. The liquid binder resin may comprise any of a number of suitable resins such as one of the synthetic polyesters, epoxide or phenolic resins, containing cure promoting agents, and suitable catalyst of known variety may be ejected along with the fluidized resin, as will be described, a typical peroxide or cobalt type catalyst of known variety being usable. More specifically, it is an additional object of the invention to provide apparatus of the character described wherein the head structure has a forwardly flaring terminally open bore, as well as containing the mentioned passages functioning as described, the first passage being located for delivering the multiple glass fiber strand in a generally forward direction and to the narrower interior region of the bore. The second or air passage means is located for delivering pressurized air to the narrower interior region of the bore in order to fragment the strand terminal and to entrain fiber fragments opening carrying them generally forward at high velocity within the bore.

Another important object of the invention includes the locating of the resin passage means for delivering the fluidized resin and catalyst in a generally tubular stream commencing proximate the mouth of the bore, the flare of the latter being characterized as tending to induce flow of the air entrained fiber fragments into intimate mixing relation with the resin and catalyst.

A further object of the invention includes the provision of head structure comprising relatively rotatable bodies each containing sections of the air and resin passages, and control means for effecting body relative rotation between a shut-off position in which the air and resin passage sections are respectively out of series communication, and an operating position in which the air and resin passage sections are respectively in series communication. In this regard, the air passage sections are, in accordance with another important aspect of the invention, spaced to come into communication slightly prior to establishment of communication between the resin passage sections, whereby the binder resin and glass fiber fragments will always be properly conveyed into intimate mixing relation. Such mixing is desirably enhanced by the provision of a rotary nozzle containing tubular portions of the air passage means, such portions having generally annular forwardly directed openings for delivering pressurized air in tubular streams. The latter, upon leaving the nozzle, travel generally forwardly at the inside and outside of the resin tubular streams, and as a consequence the resin is initially confined by the tubular air streams in such relation that the glass fiber fragments are carried into desirable mixing relation with the resin and catalyst.

Other important objects and advantages of the invention include the provision of means for controlling relative rotation of the bodies comprising the head structure, as well as a mechanism having alternate positions in which access of the glass fiber strand to the fragmenting air stream is respectively opened and closed.

These and other objects and advantages of the invention, as well as the details of an illustrative embodiment, will be more fully understood from the following detailed description of the drawings, in which:

FIG. 4 is an enlarged section taken on line 4—4 of FIG. 1;

FIG. 5 is a vertical enlarged section taken in elevation through the nozzle apparatus;

FIG. 6 is a section taken on line 6—6 of FIG. 1;

FIG. 7 is a section taken on line 7—7 of FIG. 5;

FIG. 8 is a section taken on line 8—8 of FIG. 5;

FIG. 9 is a section taken on line 9—9 of FIG. 5;

FIG. 10 is a section taken on line 10—10 of FIG. 5; and

FIG. 11 is an exploded prospective illustration of the tubular components of the head structure.

Figure 1:
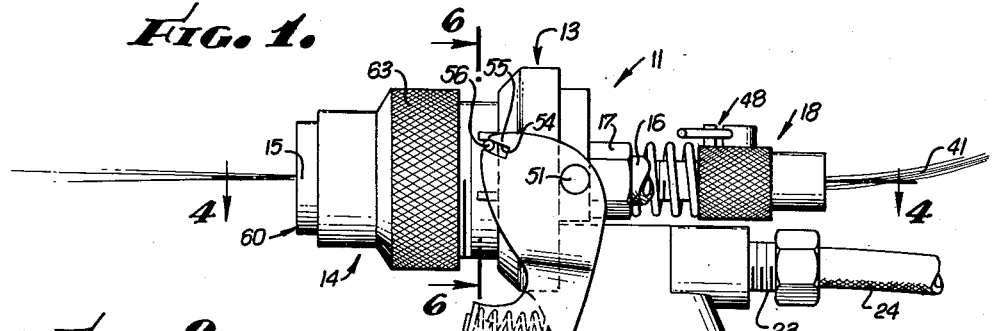
FIG. 1 is a side elevation illustrating the gun-type apparatus with which the invention is concerned.
Figure 2:
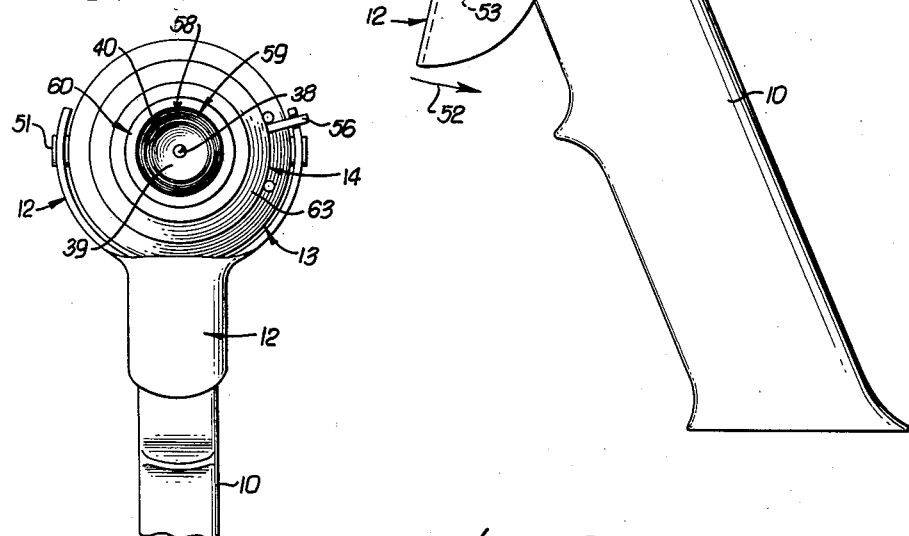
FIG. 2 is an end elevation looking toward the nozzle end of the apparatus.

Referring first to FIG. 1, the apparatus is shown to comprise a suitable handle grip 10 on which is mounted head structure 11, the apparatus having a trigger control 12. The head structure includes relatively rotatable bodies illustrated as a stationary unit 13 and a rotary unit 14, comprising an assembly of parts which will be further described. The two units have a common axis 15 extending generally forwardly or leftwardly in FIG. 1 with respect to the unit 14.

Figure 3:
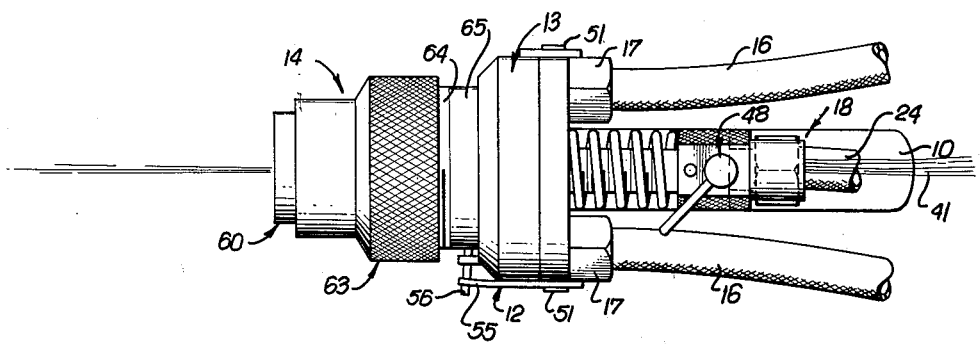
FIG. 3 is a top plan view of the FIG. 1 apparatus.

Extending the description to FIGS. 3 through 5, a pair of flexible lines is indicated at 16 as being connected at 17 to the rearward side of the stationary unit 13, and at opposite sides of tubular assembly 18. The lines 16 are adapted to conduct fluidized resin and a suitable catalyst under pressure to the resin passage means including sections or portions 19 in the fixed unit 13 and 20 in the rotary unit 14.

Extending forwardly from the section 20 is the resin tubular passage extent 21 opening at 22 in a forward direction for delivering the resin in a generally forwardly traveling tubular stream.

Also connected to the rear of the head structure as at 23 is a flexible line 24 through which compressed air is delivered to the air passage means including section or portion 25 in the stationary unit 13 and section or portion 26 in the rotatable unit 14. Air is delivered from portion 26 to the two tubular air passage portions 27 and 28 extending coaxially with the resin passage 31 and respectively outwardly at 29 and 30, respectively, so as to deliver air under pressure in tubular streams, which upon leaving the nozzle travel generally forwardly at the outside and inside of the resin tubular stream. Suitable ducts shown at 31, 32 and 33 conduct air from the passage 26 to the passage portion 28, while suitable duct 34 conducts air from the passage 26 to the tubular passage portion 27, as seen in FIG. 5.

Air also passes from duct 32 rearwardly through duct 35 in FIG. 4 to an annular inducer entrance portion 36 extending about a tubular jet terminal 37, about which the air travels forwardly through the inducer entrance and to the narrow interior region 38 of a central bore. The latter flares forwardly at 39 from the region 38 and is typically formed by a tubular part 40 as shown. The jet terminal 37 projects into the rearward entrance 36 of the part 40 for delivering a glass fiber strand 41 to the narrow region 38, wherein the strand is fragmented by the blast of air entering at 36, the fragments then being conveyed forwardly through the bore flare 39. It is a characteristic feature of the construction that the glass fragments tend to travel in concentration near the flare wall, which terminates at the forward terminus or opening of the air passage portion 30. Also, the fibers tend to travel in a swirling pattern as they are conveyed through the bore flare and into the air and resin passage streams jetting forwardly from the passage portions 21, 27 and 28. Accordingly, a highly efficient mixing and conveying of the resin, glass fibers and catalyst is established to promote the lay-up of the mix upon mold surfaces.

The axial position of the strand nozzle terminal 37 in the bore entrance 37 may be adjusted by rotation of the nozzle, the interfitting threading 42 of the rearward portion of the nozzle and the rotary tube 43 providing for such axial shifting. Such adjustment may be carried out after removal of the rearward assembly 44, which is threaded at 45 on the exterior of the tube 43. Assembly 44 contains a passage 46 through which the strand extends, and it also carries an apertured means such as a rotary cut-off 47 which is manually operated at 48 to pass the strand in one position blocking access of the strand 41 to the nozzle. A compression spring so loads the assembly 44 rearwardly to prevent rotary loosening of the assembly on the thread.

It will be seen from the drawings that the rotary unit 14 includes a tubular body portion 480 which journals at 49 in the stationary unit 13, and that there is slip face interengagement at 50 between the rotary and fixed units, the interface 50 extending in a plane which is normal to the axis of rotation 15 of the unit 14. Reference to FIG. 6 will show the relative locations of the resin passage sections 20 and air passage section 26 in the rotary unit 14, and the resin passage sections 19 and air passage section 25 in the stationary unit 13, prior to actuation. During actuation, the rotary unit 14 is rotated about the axis 15 to bring the resin passage sections 19 and 20 into registration, and also to bring the air passage sections 25 and 26 into registration, as better shown in FIG. 7. In this connection, it will be understood that the air passage sections 25 and 26 are spaced to come into communication slightly prior to establishment of communication between the resin passage sections 19 and 20. As a result, by the time the resin and catalyst are delivered at the front of the head structure, the air stream has had time to start or induce the glass fiber strand moving forwardly, to fragment the terminal thereof and carry the fibers forwardly for intimate mixing with the resin.

Rotation of the rotary unit 14 is accomplished by pulling the trigger, shown at 12 in FIG. 1, in the direction of the arrow 52, and against the resistance offered by the compression spring 53 interposed between the trigger and the handle 10. Such movement of the trigger, which is pivoted at 51, causes the slots or guides 54 in the trigger portion 55 to move downwardly, thereby carrying a pin 56 in the same direction, the pin being attached to the unit 14 and accordingly causing it to rotate in the direction of the arrow 57 shown in FIG. 6. As a result, the intercommunication of the resin passage sections, and the air passage sections previously described is established. Release of the trigger of course carries the passage sections out of communication to cut off the resin, air and glass fiber delivery.

Reference to FIGS. 4, 5, and 8 through 10 shows the unique construction of the rotary unit 14 to provide the tubular passage portions previously referred to. In this regard, the innermost tubular part 40 having the bore flare 39 has its forward portion received within a tubular sleeve 58, which is in turn received within the tubular part 59. The latter is received within the tubular part 60 having a flange 61 held against the flange 62 of part 59 by a tubular coupling 63 threaded at 64 to the rotary body part 65. It is clear from the drawings that the tubular passage portion 28 is formed between the parts 40 and 58; that the tubular passage portion 21 is formed between the tubular parts 58 and 59; and that the tubular passage portion 27 is formed between the tubular parts 59 and 60. In this regard, the parts 40, 58 and 59 are each provided with a series of circularly spaced circumferential flats 66 through 68, as well as forwardly extending edges 69 through 71 engageable with the bores of the parts within which these edges are received, as best shown in FIGS. 8 through 10. Accordingly, the parts arre kept in desirable coaxial alignment, while at the same time the spaces between the flats and the bores provide the generally tubular passage portions through which the air and resin are delivered.

From the foregoing, it will be understood that the apparatus has many advantages, both in operation and construction, afforded by the novel concepts of air, glass fiber fragment, and resin delivery as described, promoting the intimate mixing and even distribution and lay-up of the composite resin and glass fiber material upon mold surfaces.

I claim:

1. Apparatus of the character described, comprising a head structure having terminally opening passages including a first located for delivering a multiple glass fiber type strand in a generally forward direction, a second located for delivering pressurized gas to fragment the strand terminal and entrain the fiber fragments openly carrying them in a generally forward direction, and a third for delivering fluidized resin in a generally forward direction to mix with the gas entrained forwardly travelling glass fragments, said head structure including relatively rotatable units each containing portions of said gas and resin passages, and control means for effecting relative rotation between said units simultaneously to rotate the gas and resin passage portions in one unit relative to the gas and resin passage portions in the other unit, and between a shut-off position in which the gas and resin passage portions in said one unit are out of communication respectively with the gas and resin passage portions in the other unit, and an operating position in which the gas and resin passage portions in said one unit are in communication respectively with the gas and resin passage portions in said other unit.

2. Apparatus of the character described, comprising a head structure having terminally opening passages including a first located for delivering a multiple glass fiber type strand in a generally forward direction, a second location for delivering pressurized gas to fragment the strand terminal and entrain the fiber fragments openly carrying them in a generally forward direction, and a third for delivering fluidized resin in a generally forward direction to mix with the gas entrained forwardly travelling glass fragments, said third passage having a generally annular terminal opening for delivering the resin in a generally forwardly travelling tubular stream receiving the gas entrained glass fragments, said head structure including relatively rotatable units each containing portions of said gas and resin passages, and control means for effecting relative rotation between said units simultaneously to rotate the gas and resin passage portions in one unit relative to the gas and resin passage portions in the other unit, and between a shut-off position in which the gas and resin passage portions in said one unit are out of communication respectively with the gas and resin passage portions in the other unit, and an operating position in which the gas and resin passage portions in said one unit are in communication respectively with the gas and resin passage portions in said other unit.

3. Apparatus of the character described, comprising a head structure having terminally opening passages including a first located for delivering a multiple glass fiber type strand in a generally forward direction, a second located for delivering pressurized gas to fragment the strand terminal and entrain the fiber fragments openly carrying them in a generally forward direction, and a third for delivering fluidized resin in a generally forward direction to mix with the gas entrained forwardly travelling glass fragments, said third passage having a generally annular terminal opening for delivering the resin in a generally forwardly travelling tubular stream receiving the gas entrained glass fragments, said head structure also having fourth terminally opening passage means located outwardly of said first and second passages for delivering pressurized gas in a generally forwardly travelling tubular stream adjacent and generally coaxially with respect to said tubular stream of resin, said head structure including relatively rotatable units each containing portions of said gas and resin passages, and control means for effecting relative rotation between said units simultaneously to rotate the gas and resin passage portions in one unit relative to the gas and resin passage portions in the other unit, and between a shut-off position in which the gas and resin passage portions in said one unit are out of communication respectively with the gas and resin passage portions in the other unit, and an operating position in which the gas and resin passage portions in said one unit are in communication respectively with the gas and resin passage portions in said other unit.

4. Apparatus of the character described, comprising a head having a forwardly flaring terminally open bore and containing terminally opening passages including a first passage located for delivering a multiple glass fiber strand in a generally forward direction and to the narrower interior region of said bore, air passage means located for delivering pressurized air to said head and to the narrower interior region of the bore to fragment the strand terminal and to entrain fiber fragments openly carrying them generally forwardly at high velocity within said bore, and resin passage means located for delivering fluidized resin in a generally tubular stream commencing proximate the mouth of said bore, the bore flare being characterized as tending to induce flow of the air entrained fiber-fragments into intimate mixing relation with the resin, said head structure including relatively rotatable units each containing portions of said air and resin passages, and control means for effecting relative rotation between said units simultaneously to rotate the air and resin passage portions in one unit relative to the air and resin passage portions in the other unit, and between a shut-off position in which the air and resin passage portions in said one unit are out of communication with the air and resin passage portions in the other unit, and an operating position in which the air and resin passage portions in said one unit are in communication respectively with the air and resin passage portions in said other unit.

5. The invention as defined in claim 4, in which the air passage portions open at relatively slidable surfaces of said units to come into communication slightly prior to establishment of communication between said resin passage portions.

6. The invention as defined in claim 4, in which one unit is forward and comprises a rotary nozzle containing said bore and the generally annular forward terminal opening of said resin passage means.

7. The invention as defined in claim 6, in which said rotary nozzle contains tubular portions of said air passage means, said portions having generally annular forward terminal openings for delivering pressurized air in tubular streams which upon leaving the nozzle travel generally forwardly at the inside and outside of said resin tubular stream.

8. The invention as defined in claim 4, in which said head includes a forwardly extending tubular part containing said first passage, said head structure having means supporting said part for forward and rearward adjustment relative to said bore.

9. The invention as defined in claim 6, including apertured means carried by the head and movable between a first position for passing said strand to said first passage and a second position in which access of the strand to said first passage is blocked by said means.

10. The invention as defined in claim 7, in which said rotary unit includes forwardly extending concentric sleeves forming an annular resin passage and said tubular air passage portions inwardly and outwardly thereof.

11. The invention as defined in claim 10, in which one of the sleeves of each pair forming a tubular air passage portion is centered with respect to the other sleeve of said pair by engagement therewith at circularly spaced points, the said one sleeve having surface flats extending from said points and spaced from the other sleeve.

References Cited in the file of this patent

UNITED STATES PATENTS

| 1,704,498 | Deming | Mar. 5, 1929 |
| 1,987,248 | Seizer | Jan. 8, 1935 |
| 2,430,697 | Allan | Nov. 11, 1947 |
| 2,971,700 | Peeps | Feb. 14, 1961 |
| 3,033,472 | Shelton | May 8, 1962 |

FOREIGN PATENTS

| 624,066 | Great Britain | May 26, 1949 |
| 1,161,232 | France | Mar. 17, 1958 |